United States Patent Office 3,439,965
Patented Apr. 22, 1969

1

3,439,965
NEEDLE-BEARING SHELL, PARTICULARLY FOR
THE STAR PINS OF UNIVERSAL JOINTS
Hans Joachim Kleinschmidt, Essen, Germany, assignor to
Gelenkwellenbau GmbH, Essen, Germany, a corporation of Germany
Filed Oct. 3, 1967, Ser. No. 672,557
Claims priority, application Germany, Oct. 5, 1966,
G 48,087
Int. Cl. F16c 33/34, 33/46, 33/76
U.S. Cl. 308—212                          3 Claims

ABSTRACT OF THE DISCLOSURE

The sheet-metal shell of a needle bearing, preferably for journalling the star pin of a universal joint, whose inner cylindrical surface forms a race for the needles surrounding the bearing pin, has inwardly flanged rims at both axial ends. Inside the shell one of the rims serves as an annular shoulder against which an inserted bottom member is seated, and this rim has two diametrically opposite slots through which the bottom member can be inserted into the shell. The other rim has a larger number of recesses uniformly distributed along the periphery for the purpose of anchoring a sealing ring.

My invention relates to the sleeves of needle bearings and in a particular aspect to the needle bearings used on the star pins of universal joints of the Hooke or Cardanic type. In bearings for such and similar purposes the inner peripheral surface serves as a race for the needles of the bearing.

The bottom or cover with which such bearing sleeves are provided at one axial end thereof is often subjected to considerable axial thrust, this being particularly so with the above-mentioned needle bearings on the star pins of universal joints. As a rule, the bearing sleeve itself, which is mounted by being press-fitted into a bore, is drawn from sheet metal. However, if large axial thrusts are to be taken up, the wall thickness of a bottom made by deep drawing of the shell is no longer sufficient and it becomes necessary to provide the needle-bearing shell with a stronger bottom. It is known, therefore, to place a bottom member of thicker sheet material into the shell prior to inwardly bending the flange rims at both axial ends. This, however, has the disadvantage that a sufficient seal between the bottom and the inwardly bent rim cannot be secured under the pressure occurring during rotary motion in the universal joint, so that the centrifugal force acting upon the lubricant may cause the lubricant to escape between the bottom and the rim. This design has the further disadvantage that only bottom members of steel can be employed since the sleeve itself is subjected to heat treatment only after the rims have been flanged inwardly.

It is an object of my invention to devise a needle-bearing sleeve of drawn sheet metal that affords inserting into the sleeve a bottom member of any desired material as may be particularly well suited for the particular purpose, and yet to secure a good sealing action between the inserted bottom and the adjacent rim of the sleeve.

To this end, and in accordance with a feature of my invention, the drawn sheet-metal sleeve of a needle bearing according to the invention is provided, in at least one

2 of the two inwardly flanging rims of the cylindrical or tubular sleeve, with two diametrically opposite slots for the insertion of the bottom member. This permits completely manufacturing the needle-bearing sleeve inclusive of its heat treatment, before adding the bottom member. This member is then inserted in the axial direction through the two diametrical slots of the slotted sleeve rim and, after having passed into the interior of the shell, is turned 90° and placed from the inside against the peripheral shoulder formed by the slotted rim. Since the sleeve has previously been subjected to the heat treatment, the bottom need not necessarily consist of steel but may also be made of any other wear-resistant metal, such as a copper-containing alloy available in commerce under the trade mark "Cuprodur," or also of wear-resistant synthetic plastic. Since the bottom member is not subjected to the heat treatment, it remains completely planar so that often the axial pressure occurring when transmitting the axial thrust, suffices to secure a satisfactory seal between bottom and rim.

However, according to a preferred embodiment of the invention, I provide a sealing member between the slotted rim of the bearing shell and the inserted bottom member. Suitable as such an insert, for example, is a sealing string placed between the bottom and the peripheral shoulder formed by the rim. Instead, a sealing mass of plastic material may be inserted between rim and bottom, or the bottom may be cemented by means of an adhesive to the inner peripheral shoulder formed by the rim.

According to another preferred feature of the invention, the other inwardly flanging rim of the bearing shell is provided with more than two recesses such as slots or bores or the like which are uniformly distributed along the periphery. These slots serve to anchor the sealing ring serving for sealing the open end of the needle-bearing sleeve relative to the bearing pin, such as the star pin of a universal joint.

The invention will be further described with reference to an embodiment illustrated by way of example on the accompanying drawings in which.

Figure 1:
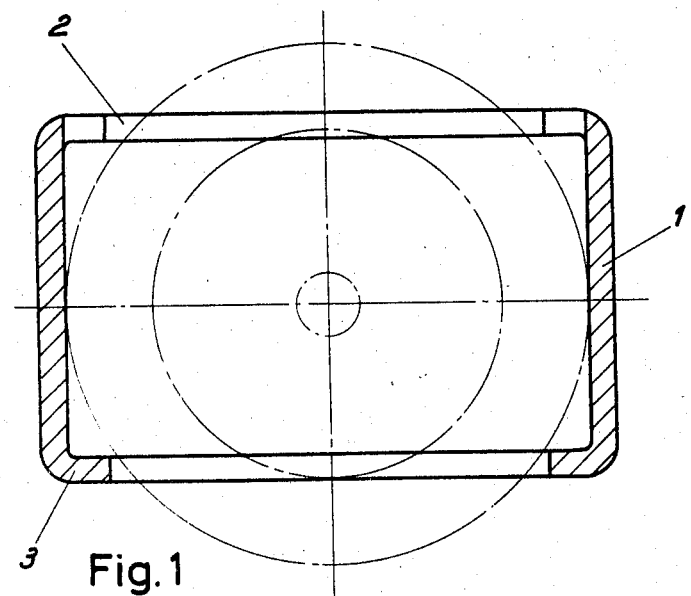
FIG. 1 is a longitudinal section through a needle-bearing sleeve according to the invention.
Figure 2:
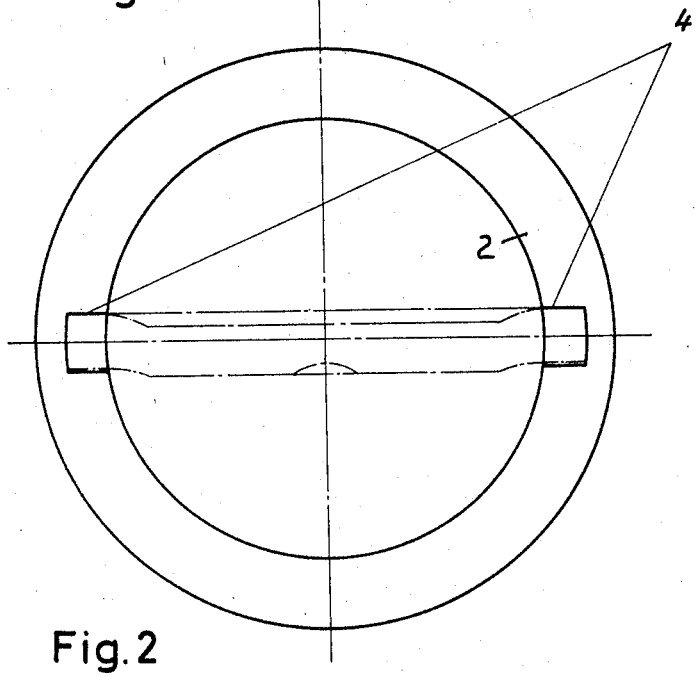
FIG. 2 is a plan view of the same bearing sleeve.
Figure 3:
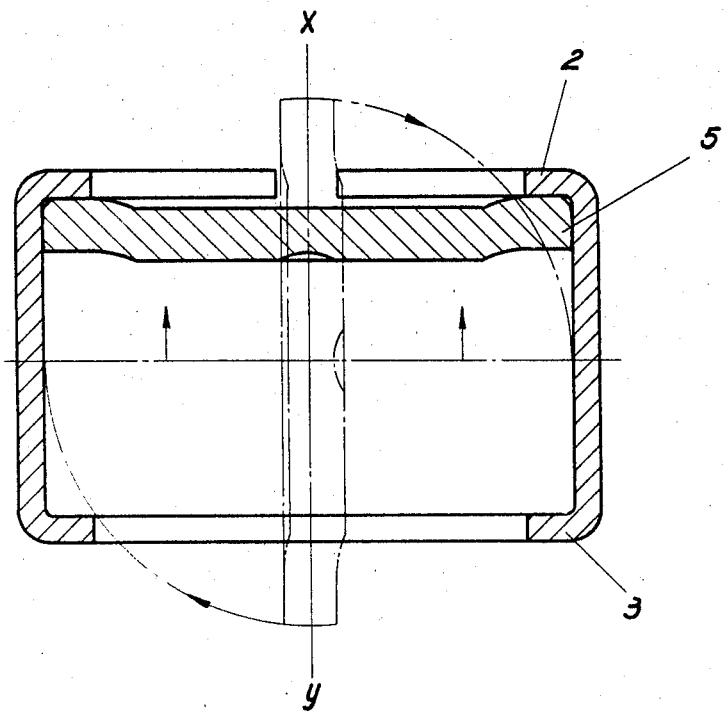
Figure 4:
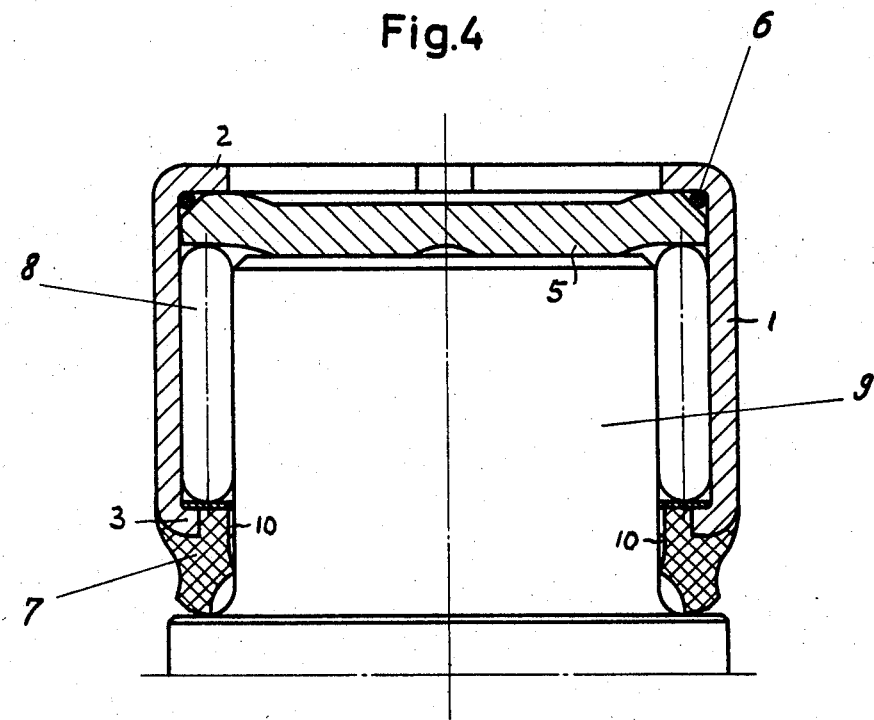

FIG. 3 corresponds to FIG. 1 and illustrates the insertion of the bottom member into the bearing sleeve; and FIG. 4 shows in diametrical section a completely assembled needle bearing with a bearing sleeve according to the invention engaging the appertaining bearing pin.

The bearing sleeve 1 of sheet metal shown on the drawings is first provided in the conventional manner with two inwardly bent, flange-like rims 2 and 3. The rim 2 is then punched to form two slots 4 extending diametrically opposite each other from the inner periphery of the rim to the cylindrical inner wall surface of the shell. The slots have such a peripheral width and radial depth that, upon completed heat treatment of the shell 1, the separately produced bottom member 5 according to FIG. 3, when placed with its plane parallel to the axis X–Y, can be shoved through the two slots. After the bottom is thus moved into the interior of the shell, it is turned 90° (as indicated by arrows in FIG. 3) and then placed against the inner peripheral shoulder formed by the rim 2.

In the somewhat modified embodiment illustrated in FIG. 4, the hermetic seal between the rim 2 and the adjacent bottom 5 is improved by bevelling the bottom 5 at its upper periphery and using the resulting interspace for accommodating an inserted sealing string 6. The inner peripheral wall surface of the sleeve serves as a race for the needles 8 of the bearing which are engaged by the bearing pin 9 such as the star pin of a universal joint. A sealing ring 7 of rubber or other compressible material is located at the other rim of the sleeve and is anchored in several slits 10 in the rim 3. The slits are uniformly distributed over the inner periphery of the rim. The sealing ring 7 serves to seal the needle bearing at the inner end of the star pin 9.

I claim:
1. A needle-bearing shell of drawn sheet metal, such as for journalling the star pins of universal joints, comprising a drawn sheet-metal body of tubular shape having inwardly flanged rims at both axial ends, at least one of said rims forming an annular shoulder within said shell and having two diametrically opposite slots extending outwardly from the inner periphery of the rim, and a circular sleeve bottom member tightly seatable on said shoulder and being insertable from the outside through said two slots.

2. A needle-bearing shell according to claim 1, comprising a compressible sealing member between said shoulder and said bottom member.

3. In a needle-bearing shell according to claim 1, said other rim having more than two recesses uniformly distributed along the periphery, and a sealing ring disposed on said other rim and anchored in said recesses.

References Cited

FOREIGN PATENTS 76,965  12/1959  France.

MARTIN P. SCHWADRON, *Primary Examiner.*

FRANK SUSKO, *Assistant Examiner.*

U.S. Cl. X.R.

308—187.2